Patented July 25, 1950

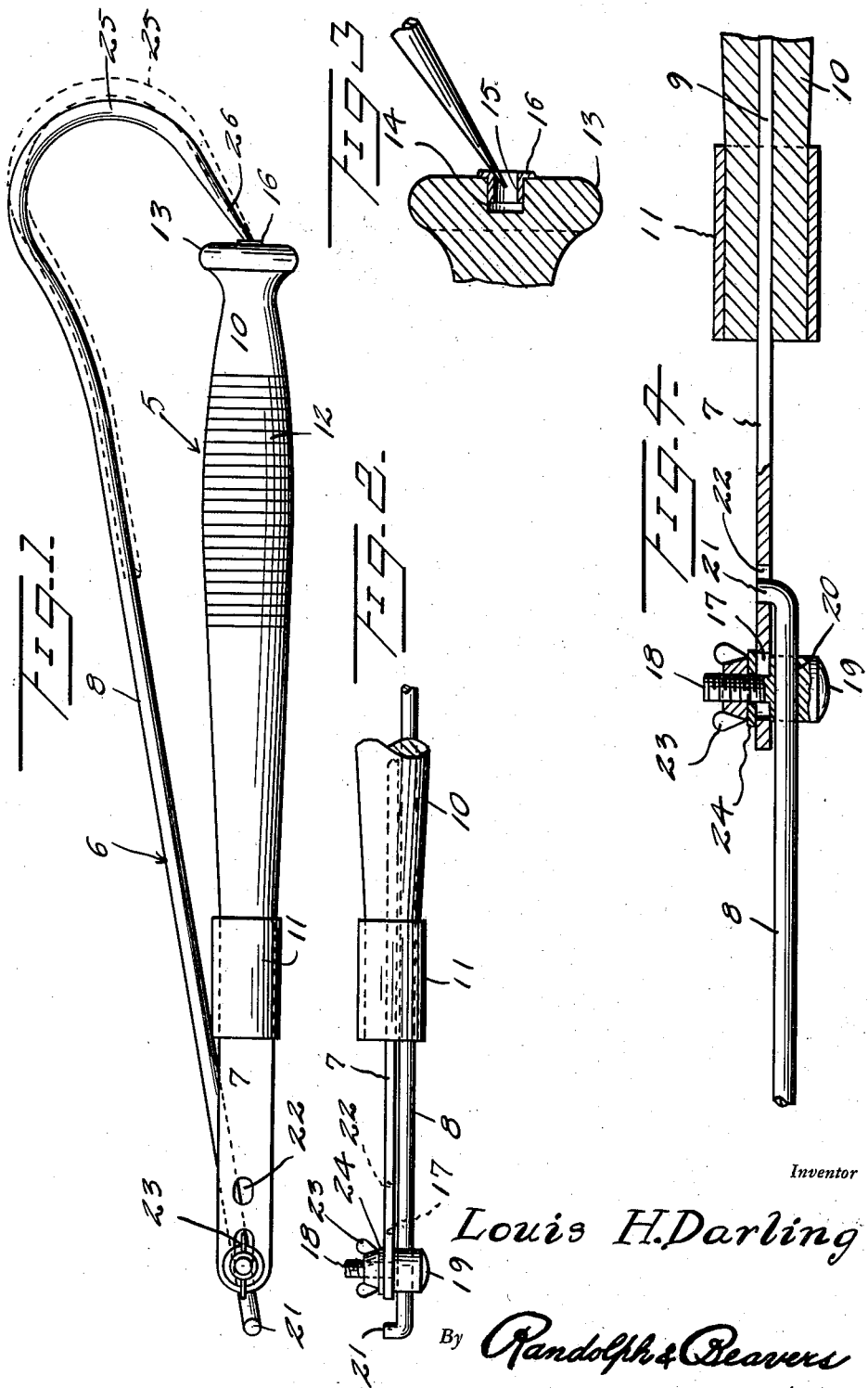

2,516,620

UNITED STATES PATENT OFFICE 2,516,620

FOLDING GAFF HOOK

Louis H. Darling, Vallejo, Calif., assignor to Fol-Gaf Limited, Stockton, Calif., a limited partnership Application April 12, 1946, Serial No. 661,761

2 Claims. (Cl. 294—26)

This invention relates to improvements in folding gaff hooks and especially to improvements on my prior United States Letters Patent No. 2,214,660, issued September 10, 1940, and relating to a Folding Gaff Hook.

It is a primary object of the present invention to provide a folding gaff hook of extremely simple construction which is capable of being economically manufactured and sold and which is composed of a minimum of parts combined in a manner to increase to the maximum the durability of the gaff hook.

A further aim of the invention is to provide a gaff hook having means to effectively maintain the shank of the hook in either an extended or folded position and which is so constructed as to positively prevent accidental folding or collapsing of the hook while in use.

Other objects and advantages of the invention will hereinafter become more fully apparent from the following description of the drawing, which illustrates a preferred embodiment thereof, and wherein:

Figure 1 is a top plan view showing the gaff hook folded;

Figure 2 is a fragmentary side elevational view thereof;

Figure 3 is a fragmentary side elevational view of the handle, partly in vertical section; and Figure 4 is a fragmentary side elevational view, partly in section showing the hook in an extended position.

Referring more particularly to the drawing, the improved folding gaff hook is designated generally 5 and includes an elongated shank, designated generally 6, composed of the shank sections 7 and 8.

The shank section 7 preferably assumes the form of an elongated, substantially flat metal bar, one end 9 of which extends longitudinally into an elongated handle 10 and which is anchored therein in any suitable manner. The handle 10 is provided with a retaining collar or band 11 at the end thereof from which the shank section 7 extends; said handle 10 being enlarged slightly near its opposite end and being externally serrated or grooved in the portion 12 thereof to provide a hand grip. The outer, free end of the handle 10 terminates in a knob 13 having a substantially flat outer end which is provided with an outwardly opening recess 14 in which is suitably secured a grommet or sleeve 15. The grommet or sleeve 15 is provided with an annular flange 16, at its outer end, which bears against the outer surface of the knob 13. The handle 10 is preferably similar in size and shape to handle portions of fishing rods and may be formed of any suitable material including wood or plastic.

The exposed end of the shank section 7, adjacent its terminal, is provided with an elongated, longitudinally disposed opening 17 which extends transversely therethrough to receive the threaded shank 18 of a bolt having an enlarged head 19. The outer shank section 8 is substantially circular in cross-section and has a portion thereof, adjacent the inner end of the section 8, extending diametrically through an opening 20 in the bolt head 19. Said shank portion is fixedly disposed in the opening 20 and has its inner end extending slightly therebeyond and terminating in an angular extension 21 which projects toward the shank section 7 and which, when the gaff hook 5 is extended, as seen in Figure 4, fits into a longitudinally elongated opening 22 of the shank section 7. The threaded bolt shank 18 is loosely received in the opening 17 and is equipped with a wing nut 23 and a washer 24, which are located on the opposite side of the shank 7 to the head 19.

The shank section 8, adjacent its opposite end, is bent to provide a hook 25 which terminates in a tapered bill 26.

As previously stated, the opening 22 is positioned to receive the extension 21 when the shank sections are in extended position with respect to each other, as seen in Figure 4, and by the simple expedient of tightening the wing nut 23, the inner face of the head 19 will be clamped against a side of the shank section 7 to prevent displacement of extension 21 from opening 22 to thereby positively retain the gaff hook 5 in an extended position. To fold the gaff hook, the wing nut 23 is loosened sufficiently to permit disengagement of extension 21 from opening 22 after which the shank section 8 can be folded with respect to the shank section 7 and handle 10 so as to position the hook bill 26 adjacent the grommet 15. The elongated opening 17 permits a limited sliding movement of the bolt shank 18 and shank section 8 with respect to the handle 10 and shank section 7 to permit insertion of the bill 26 into the grommet 15, as illustrated in Figure 3. This longitudinal sliding movement of the shank section 8 is indicated by the dotted and full line positions of the hook 25 in Figure 1. After positioning the bill 26 in the grommet 15, the nut 23 is tightened by clamping the bolt and the shank section 8, carried thereby, to prevent longitudinal displacement thereof with respect to the handle 10, so as to retain the gaff hook in a folded position. By loosening the nut 23, the hook 25 can be moved from its full line to its dotted line position of Figure 1 to permit returning the gaff hook 5 to an extended, operative position.

Various modifications and changes are contemplated and may obviously be resorted to without departing from the spirit and scope of the invention as hereinafter defined by the appended claims.

I claim:

1. In a folding gaff hook, an elongated shank formed of a pair of sections including an outer and inner section, said outer section terminating at its extremity in a hook, a bolt having a head to which the outer shank section is fixed adjacent its inner end, said inner shank section having an elongated opening to slidably and turnably receive the bolt shank, means for clamping the bolt head to the inner shank section, said inner shank section having a second opening, and a lug on the inner extremity of the outer shank section engageable in said second opening to retain the shank sections in extended positions.

2. In a folding gaff hook, an elongated shank formed of a pair of sections including an outer and an inner section, said outer section terminating at its extremity in a hook, a bolt having a head to which the outer shank section is fixed adjacent its inner end, said inner shank section having an elongated opening to slidably and turnably receive the bolt shank, means for clamping the bolt head to the inner shank section, said inner shank section having a second opening, a lug on the inner extremity of the outer shank section engageable in said second opening to retain the shank sections in extended positions, and a handle connected to the opposite, remote end of the inner shank section and provided with a socket in the outer end thereof to receive the bill of said hook when the shank sections are folded and slidably adjusted.

LOUIS H. DARLING.

REFERENCES CITED

The following references are of record in the file of this patent:

UNITED STATES PATENTS

| Number | Name | Date |
|---|---|---|
| D. 136,856 | Olowecki | Dec. 14, 1943 |
| 136,690 | Aufdembrinke | Mar. 11, 1873 |
| 304,481 | Wilson | Sept. 2, 1884 |
| 322,914 | Cutter | July 28, 1885 |
| 394,304 | Schmitt | Dec. 11, 1888 |
| 895,126 | Thomson | Aug. 4, 1908 |
| 1,475,301 | Hartleb | Nov. 27, 1923 |
| 2,242,900 | Bender | May 20, 1941 |

FOREIGN PATENTS

| Number | Country | Date |
|---|---|---|
| 5,465 | Great Britain | 1907 |
| 210,311 | Great Britain | Jan. 31, 1924 |